United States Patent

Schmitz

Patent Number: 5,375,269
Date of Patent: Dec. 27, 1994

[54] WATER-SAVING DEVICE FOR TOILETS

[75] Inventor: Peter J. Schmitz, Orillia, Canada

[73] Assignee: 981578 Ontario Inc., Cambridge, Canada

[21] Appl. No.: 67,035

[22] Filed: May 26, 1993

[30] Foreign Application Priority Data

May 29, 1992 [CA] Canada ................. 2070064

[51] Int. Cl.⁵ ............................................. E03D 1/36
[52] U.S. Cl. .............................................. 4/415; 4/324
[58] Field of Search .................. 4/324, 391, 394, 395, 4/396, 397; 403/326; 4/415

[56] References Cited

U.S. PATENT DOCUMENTS

| | | | |
|---|---|---|---|
| 2,982,586 | 5/1961 | Gliebe | 403/326 |
| 3,145,406 | 8/1964 | Lay | 403/326 |
| 3,777,316 | 12/1973 | Coetzee | 4/324 |
| 4,651,359 | 3/1987 | Battle | 4/324 |
| 4,840,291 | 6/1989 | Merlin | 403/326 |
| 5,191,661 | 3/1993 | Chang | 4/324 |

FOREIGN PATENT DOCUMENTS 2745505  4/1979  Germany ................. 4/324

Primary Examiner—Henry J. Recla
Assistant Examiner—Charles R. Eloshway
Attorney, Agent, or Firm—R. Craig Armstrong

[57] ABSTRACT

The water-saving devices for a toilet is of the type which float up and down on the overflow tube, where downward movement of the device brings it into contact with the flapper valve at the bottom of the toilet tank in order to close it prematurely, thereby reducing the amount of water used for the flush. Upper and lower opposing cup shapes are integrally mounted around respective cylindrical sleeves, the sleeves being adapted to slide one within the other to adjust the spacing between the opposing cup shapes. One sleeve has an inset area with a longitudinal row of spaced holes or indentations. The other sleeve has an elongated tongue having a raised dimple which engages one of the spaced holes or indentations to set the spacing between cup shapes. A number of ribs or vanes are molded as part of the upper cup, and act to deflect the float rod to reduce any possibility of the float rod catching under the upper cup. The cup shades are not cylindrical, but instead have flat vertical surfaces relatively close to the sleeves, so that the device can still be installed in tanks where the overflow tube is close to the tank wall. A C-shaped shell snaps onto the lower cup and is rotatable between a first position in which it leaves the flat surface exposed, and a second position in which the lower cup in effect takes on a circular shape.

8 Claims, 5 Drawing Sheets

WATER-SAVING DEVICE FOR TOILETS

BACKGROUND OF THE INVENTION

This invention relates to water saving devices for toilets, and in particular those of the type which float up and down on the overflow tube, where downward movement of the device brings it into contact with the flapper valve at the bottom of the toilet tank in order to close it prematurely, thereby reducing the amount of water used for the flush.

Such devices are known in the prior art, and are illustrated in several prior art patents. These include, for example, U.S. Pat. Nos. 4,937,895, 4,748,699, 5,073,995, 5,086,524, 5,040,247, 4,945,578, and 4,651,359.

The principle underlying all of these prior art devices is that as the toilet tank fills, the devices float upwardly around the overflow pipe, so that they are clear of the flapper valve at the bottom of the toilet tank, which covers the outlet to the toilet bowl. When the toilet is flushed, by virtue of the flapper valve being raised to uncover the outlet, the water level in the tank drops and the device drops down with it, at a certain point coming into contact with the flapper valve to push it back to the closed position prematurely, i.e. before all of the water has drained from the tank. This results in a substantial saving of water, and yet in most cases an effective flush is still achieved. The full pressure head of water in the tank is used, which would not be the case if the water saving was effected by virtue of the tank being only partially filled, for example.

Several of the prior art devices involve upper and lower halves which are moveable towards and away from each other to vary the point at which the flapper valve will be contacted to close it. See for example U.S. Pat. No. 4,748,699. In such an arrangement, however, there is some potential for the device to hang up on the float arm in some toilet tank configurations, by virtue of the float arm becoming caught on the underside of the upper cup shape.

In other devices, such as in U.S. Pat. No. 4,945,578, there is no positive means of locking the two cup shapes together in any given position, so that there is potential for the relative position of the cups to change with time. Some devices have recognized this problem, and thus in U.S. Pat. No. 4,937,895, a threaded design is used.

A problem in some toilet tanks is that the overflow pipe may be positioned quite close to the rear wall of the tank, or the tank may be insulated. In either event, there may be very little space between the overflow tube and the rear wall or insulation of the tank. This potential problem has been recognized by providing a cup which has a flattened side, as in U.S. Pat. No. 4,937,895.

SUMMARY OF THE INVENTION

It is an object of the invention to provide a device of the same general type as those referred to above, but which overcomes the various problems of prior art devices.

In the invention, there are upper and lower opposing cup shapes, each around respective cylindrical sleeves, the sleeves being adapted to slide one within the other to adjust the spacing between the opposing cup shapes. One sleeve has an inset area with a longitudinal row of spaced holes or indentations. The other sleeve has an elongated tongue having a raised dimple which engages one of the spaced holes or indentations to set the spacing between cup shapes.

A number of ribs or vanes (six of them in the preferred embodiment, evenly spaced around the device), are molded as part of the upper cup, and act to deflect the float rod to reduce any possibility of the float rod catching under the upper cup.

The cup shapes are not cylindrical, but instead have flat vertical surfaces relatively close to the sleeves, so that the device can still be installed in tanks where the overflow tube is close to the tank wall. The tank wall keeps the device aligned with the flat surfaces facing it, since there is not enough room for it to rotate. For proper operation in toilet tanks where there is ample clearance, a C-shaped shell snaps onto the lower cup and is rotatable between a first position in which it leaves the flat surface exposed, and a second position in which the lower cup in effect takes on a circular shape.

Further features of the invention will be described or will become apparent in the course of the following detailed description.

BRIEF DESCRIPTION OF THE DRAWINGS

In order that the invention may be more clearly understood the preferred embodiment thereof will now be described in detail by way of example, with reference to the accompanying drawings, in which.

DETAILED DESCRIPTION

Figure 1:
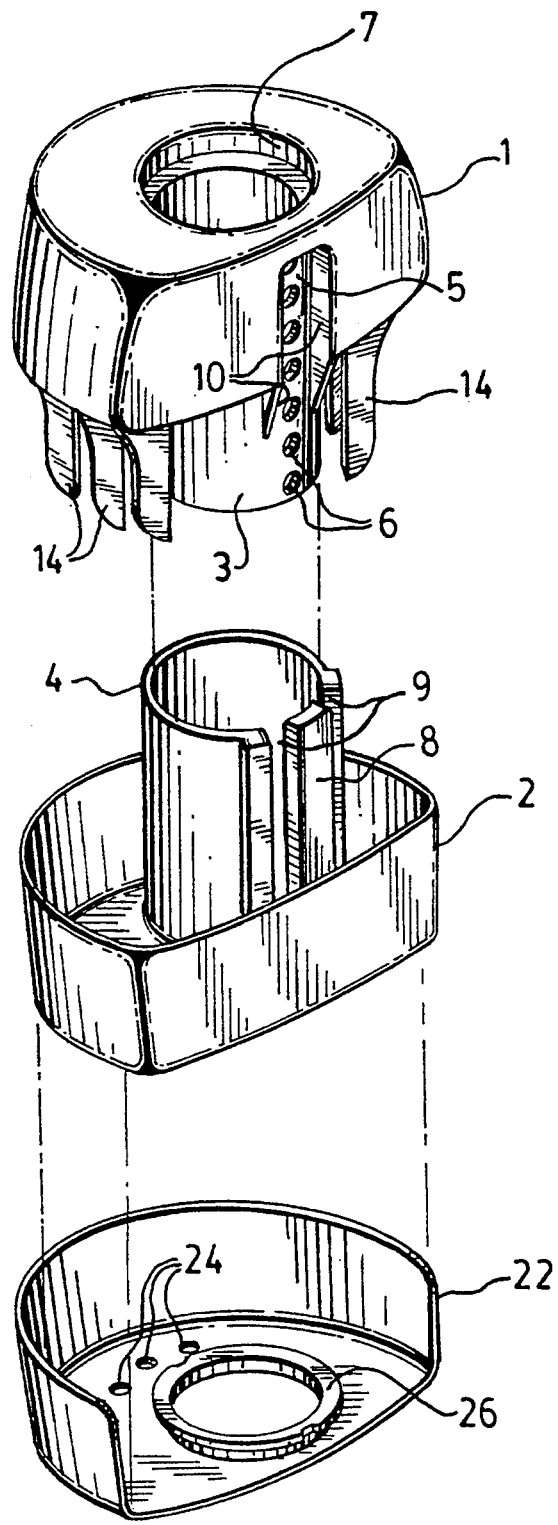
FIG. 1 is an exploded perspective of the preferred embodiment.
Figure 2:
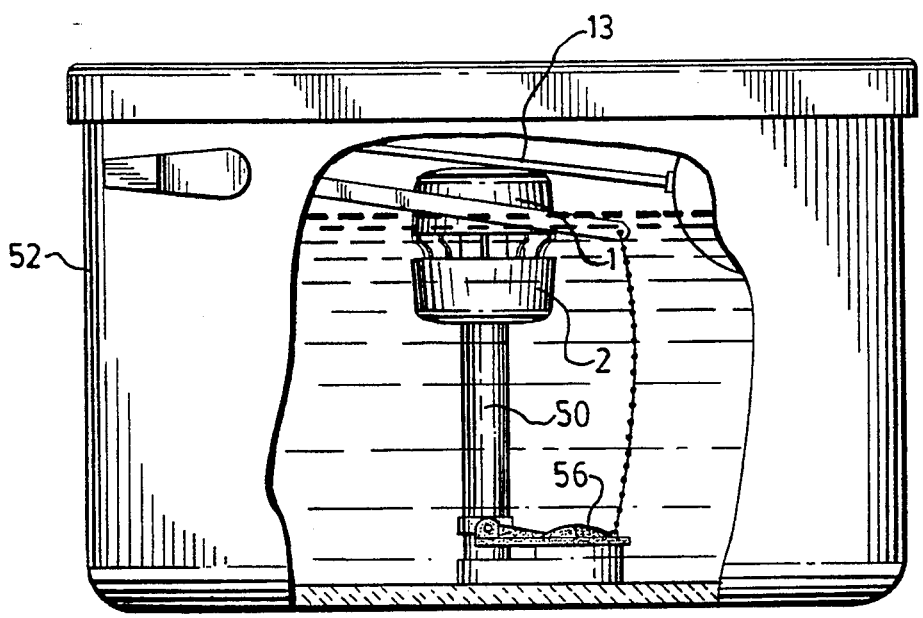
FIG. 2 is a front elevation view of a full toilet tank with the device installed, with the tank cut away to show the device and other components.
Figure 3:
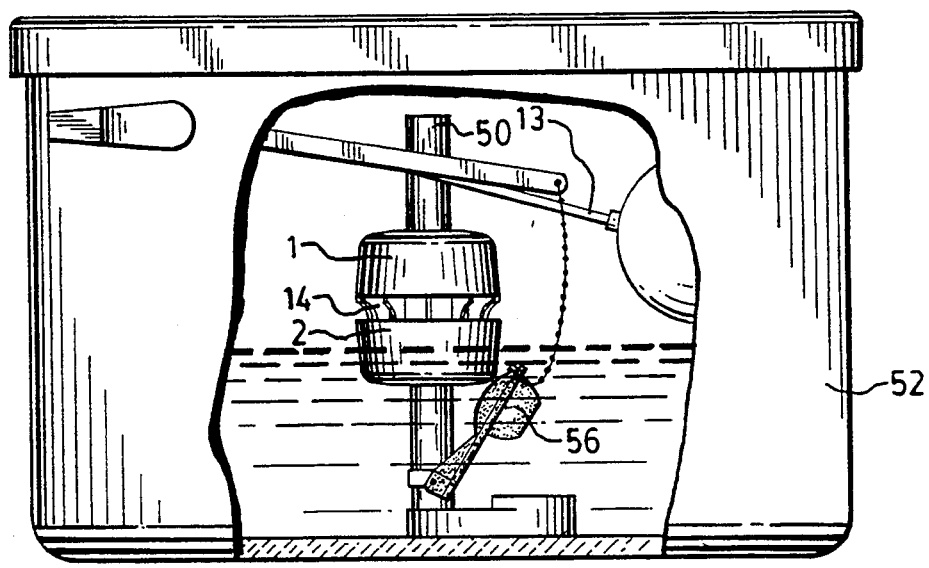
FIG. 3 is the same view as FIG. 2, but with the tank emptying.
Figure 4:
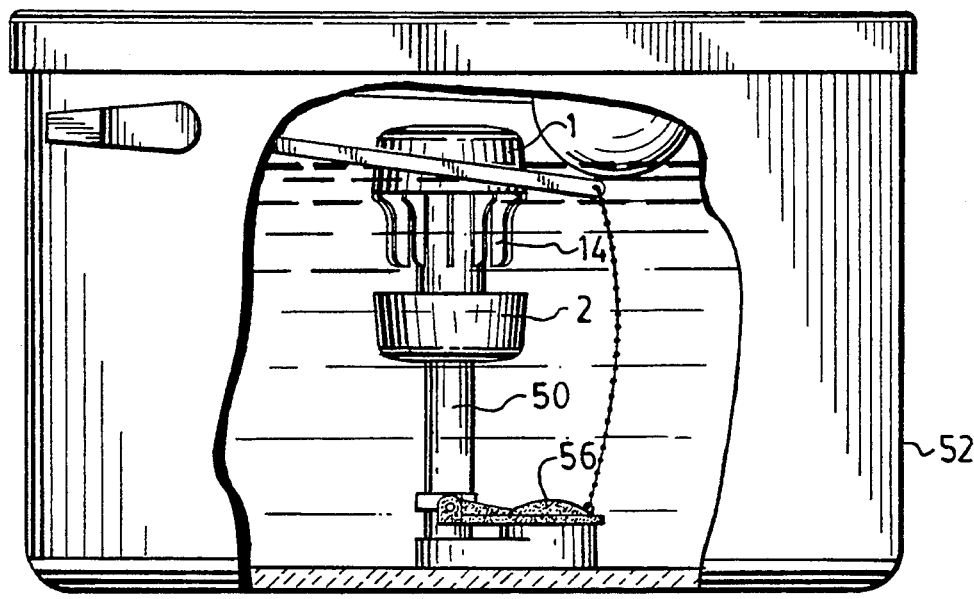
FIG. 4 is a front elevation view of a full toilet tank with the device installed, with the tank cut away to show the device and other components, and with the device expanded to the maximum separation between upper and lower cups.

Referring now to the drawings, the device has opposing upper and lower cup shapes 1 and 2 respectively, as in the prior art, each integrally mounted on hollow cylindrical sleeves, namely upper sleeve 3 and lower sleeve 4.

The lower sleeve 4 fits closely over the upper sleeve 3, and slides up and down thereon, such that the distance between the upper and lower cup shapes may be adjusted.

The upper sleeve has an inset area 5 with a longitudinal row of recesses, in the form of spaced holes or indentations 6. The lower sleeve has an elongated tongue 8 defined by two longitudinal slots 9. The tongue rides in a channel defined by two walls 10 on either side of the row of holes or indentations. The inside of the tongue has a raised dimple 12 which engages one of the 5 spaced holes or indentations. Since the tongue is elongated, it is therefore somewhat springy, and the cup shades can be pulled apart or pushed together to any desired spacing corresponding to one of the hole or indentation locations, with a "click-lock" effect as the dimple jumps from one hole or indentation to another. The dimple is rounded so that it can be readily forced out of the holes or indentations rather than being locked therein. This provides a means for adjusting the spacing of the cup shapes readily and easily, while still ensuring a sufficiently secure positioning to be sure that inadvertent variation in the cup spacing does not take place, either during installation or thereafter.

The upper cup preferably has a recessed area 7 at the top thereof, to provide clearance for the refill tube clip which is commonly located at the top of the overflow tube.

In the prior art, as discussed previously, there is a possibility that the float rod 13 could catch underneath the upper cup in some toilet configurations. In the invention, this is avoided by providing a number of ribs or vanes 14 (six of them in the preferred embodiment, evenly spaced around the device), molded as part of the upper cup. Each vane preferably has a short upper outer edge 16 which is aligned with the outer periphery of the upper cup, to further reduce any possibility of the float rod catching under the lower edge of the cup. The vanes then must then taper inwardly a little, to fit within the lower cup. Gaps 18 must of course be provided at the inner edge of the vanes, to accommodate the lower sleeve 4.

Figure 6:
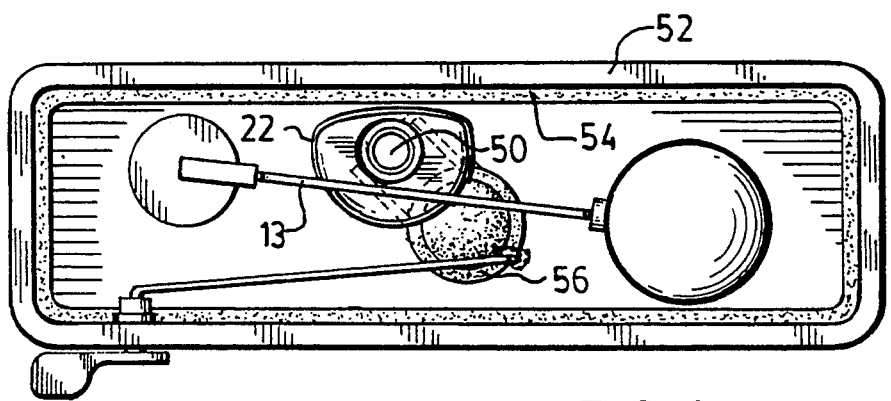
FIG. 6 is a top view of a toilet tank in which there is very little clearance between the overflow tube and the back wall or insulation of the tank.
Figure 7:
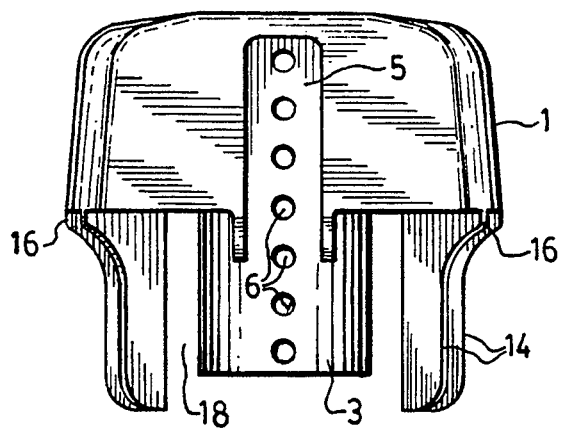
FIG. 7 is a side view of the upper cup.
Figure 11:
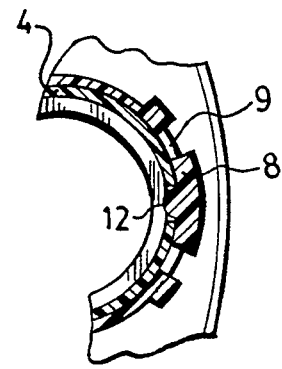
FIG. 11 is a sectional plan view, from FIG. 10.
Figure 8:
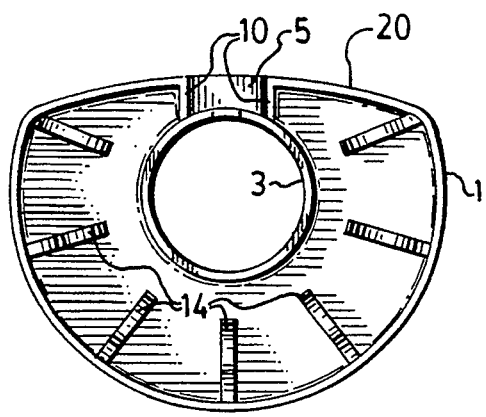
FIG. 8 is a bottom view of the upper cup.
Figure 9:
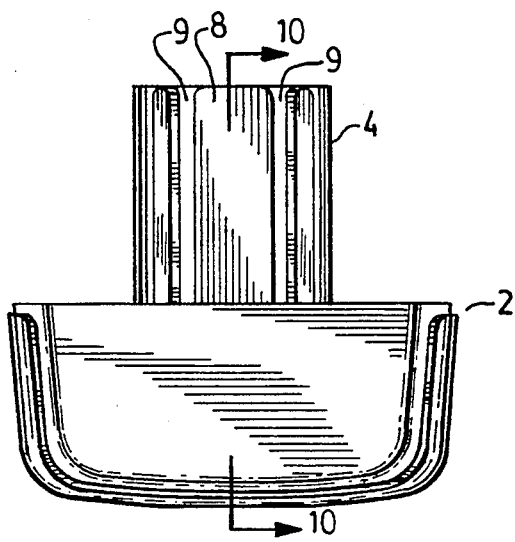
FIG. 9 is a side view of the lower cup.
Figure 10:
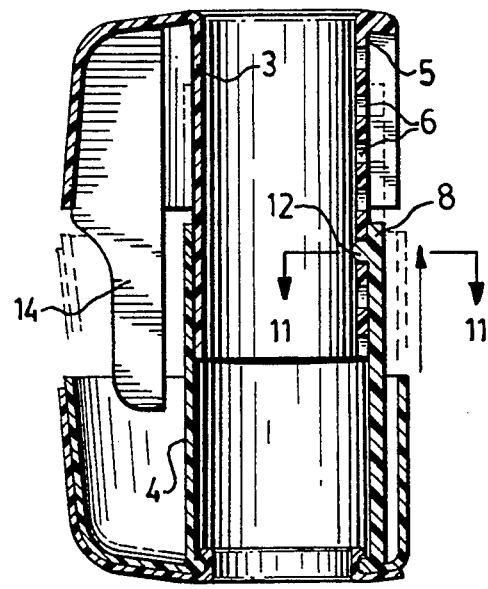
FIG. 10 is a sectional elevation of the assembled device, from FIG. 9.
Figure 12:
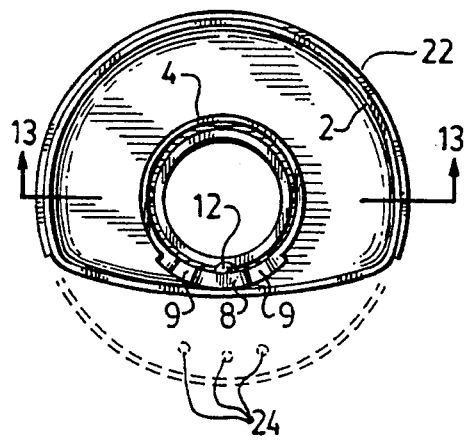
FIG. 12 is a top view of the lower cup.
Figure 15:
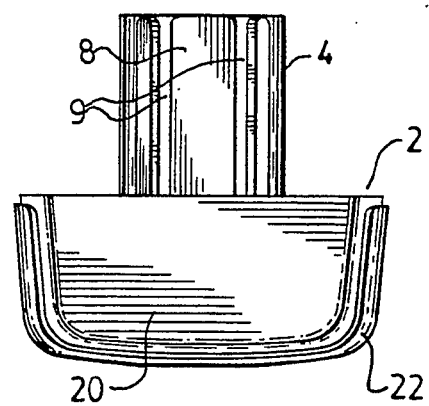
FIG. 15 is a side view of the lower cup, with the C-shape installed.
Figure 13:
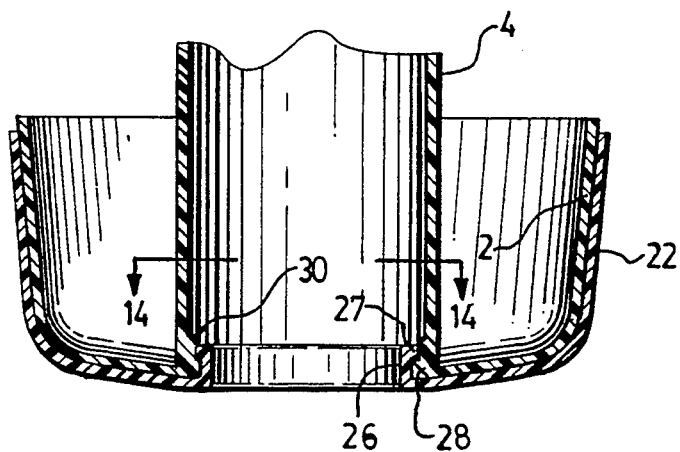
FIG. 13 is a sectional elevation of the lower cup, from FIG. 12, showing the mounting of the C-shape.
Figure 14:
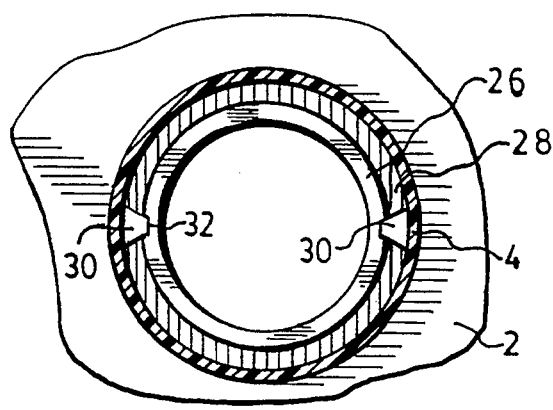
FIG. 14 is a sectional plan view, from FIG. 13.

Since some toilets do not provide much clearance between the overflow tube 50 and the tank wall 52 and/or insulation 54, as seen in FIG. 6, the cup shapes 1 and 2 are not cylindrical, but instead have flat vertical surfaces 20 relatively close to the sleeves 3 and 4, so that the device can still be installed by having the flat surfaces face the tank wall. The tank wall keeps the device aligned with the flat surfaces facing it, since there is not enough room for it to rotate.

Figure 5:
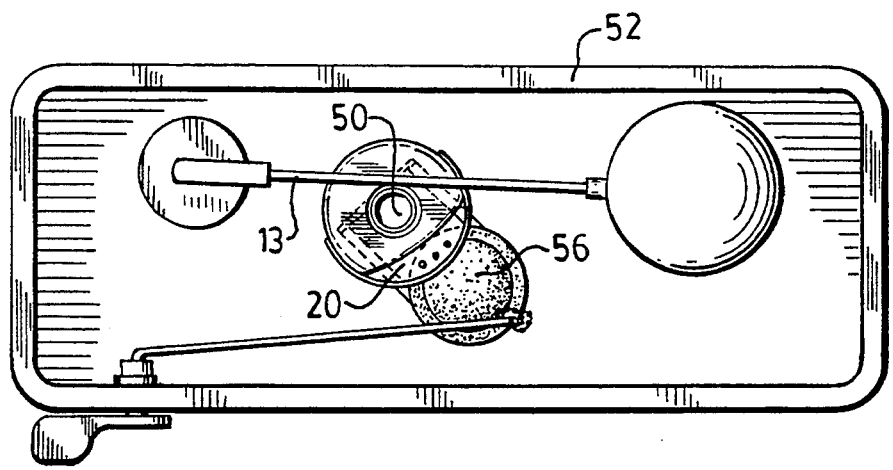
FIG. 5 is a top view of a toilet tank of ample spacing.

However, where there is ample clearance in the tank, as in FIG. 5, the flat vertical surface of the lower cup may be too close to the sleeve to properly contact the flapper valve 56 to close it, should the device rotate so that the flat surface is facing the flapper valve. To avoid this possibility, a C-shaped shell 22 snaps onto the lower cup 2, and is rotatable between a first position in which it covers the rounded portion of the cup, leaving the flat surface exposed, and a second position in which the lower cup in effect takes on a circular shape. When the flat surface is facing the flapper valve, the C-shape extends outwardly therefrom sufficiently to contact the flapper valve. The bottom of the C-shape has drain holes 24 so that water does not collect.

The C-shape snaps onto the lower cup by virtue of a collar 26 having a small flange 27 which snaps over a lip 28 protruding inwardly from the lower sleeve 4. Small bumps 30 snap into corresponding notches 32, 180 degrees apart, such that the C-shape snaps into the two positions, but not so firmly as to make rotation by hand difficult.

So that the purchaser is not inclined to install the device with the C-shape in the "flat" position unless necessary, since the device may then not work, the device should be supplied with the C-shape in the "round" position, so that the purchaser is inclined to change the position only if necessary to fit the device into the tank.

Preferably, the top of the upper cup 1 is marked "This Side Up", to reduce the possibility of the device being installed upside down, in which case it might not work if the flat surface is facing the flapper valve.

It will be appreciated that the above description relates to the preferred embodiment by way of example only. Many variations will be obvious to those knowledgeable in the field, and such obvious variations are within the scope of the invention as claimed, whether or not expressly described.

What is claimed as the invention is:

1. A toilet water-saving device comprising:
   a downwardly opening upper cup shape integrally mounted on an open upper cylindrical sleeve projecting downwardly therefrom; and
   an upwardly opening lower cup shape integrally mounted on an open lower cylindrical sleeve projecting upwardly therefrom;
   where one of said sleeves fits closely within the other said sleeve for relative sliding movement whereby the spacing between said upper and lower cup shapes may be adjusted, one of said sleeves having a plurality of recesses spaced longitudinally therealong facing said other sleeve, said other sleeve having a flexible detent button projecting therefrom towards said recesses, for engagement in a selected one of said recesses to releasably secure said sleeves to each other at a spacing between said cup shapes corresponding to the selected one of said recesses;
   and in which said cup shapes are generally circular in cross-section, except for a somewhat flattened vertical surface on corresponding sides of each cup shape, there thus being circular and flattened portions of said cup shapes, such that said flattened surfaces are substantially closer to said sleeve than are peripheries of said cup shapes elsewhere;
   and further comprising a generally C-shaped cover corresponding in shape to the circular portion of said lower cup shape, rotatably mounted on the outside of said lower cup shape for rotation between a first position surrounding the circular portion of the cup shape in which it leaves the somewhat flattened surface of the cup shape exposed, and a second position in which said cover is rotated over said somewhat flattened surface, such that said lower cup and cover together take on a circular shape.

2. A toilet water-saving device as recited in claim 1, further comprising a plurality of spaced-apart vanes projecting downwardly from an outer periphery of said upper cup shape towards said lower cup shape, whereby a float rod is prevented from entering the space between said upper and lower cup shapes.

3. A toilet water-saving device as recited in claim 2, in which said rotatable mounting is by virtue of a collar on said C-shape which snaps into engagement with a lip projecting inwardly from said lower sleeve.

4. A toilet water-saving device as recited in claim 3, in which said flexible detent button is provided by virtue of two longitudinal slots in said sleeve having said button, said slots defining a resilient strip portion of said sleeve, said button projecting from said strip.

5. A toilet water-saving device as recited in claim 2, in which said flexible detent button is provided by virtue of two longitudinal slots in said sleeve having said button, said slots defining a resilient strip portion of said sleeve, said button projecting from said strip.

6. A toilet water-saving device as recited in claim 1, in which said rotatable mounting is by virtue of a collar on said C-shape which snaps into engagement with a lip projecting inwardly from said lower sleeve.

7. A toilet water-saving device as recited in claim 6, in which said flexible detent button is provided by virtue of two longitudinal slots in said sleeve having said button, said slots defining a resilient strip portion of said sleeve, said button projecting from said strip.

8. A toilet water-saving device as recited in claim 1, in which said flexible detent button is provided by virtue of two longitudinal slots in said sleeve having said button, said slots defining a resilient strip portion of said sleeve, said button projecting from said strip.

* * * * *